*William M. Pratt*

*Impt in Threshing Machines.*

No. 117812     PATENTED AUG 8 1871

Witnesses:

Inventor:
William M. Pratt

William M. Pratt
Impt in Threshing Machines.
117812

Witnesses:

Inventor:
William M. Pratt

UNITED STATES PATENT OFFICE.

WILLIAM M. PRATT, OF CHICAGO, ILLINOIS.

IMPROVEMENT IN THRASHING-MACHINES.

Specification forming part of Letters Patent No. 117,812, dated August 8, 1871.

*To all whom it may concern:*

Be it known that I, WILLIAM M. PRATT, of Chicago, in the county of Cook and State of Illinois, have invented certain Improvements in Thrashing-Machines; and I do hereby declare that the following is a full, clear, and exact description thereof, reference being had to the accompanying drawing, which, together with the letters and figures marked thereon, forms part of this specification, and in which—

Figure 1:
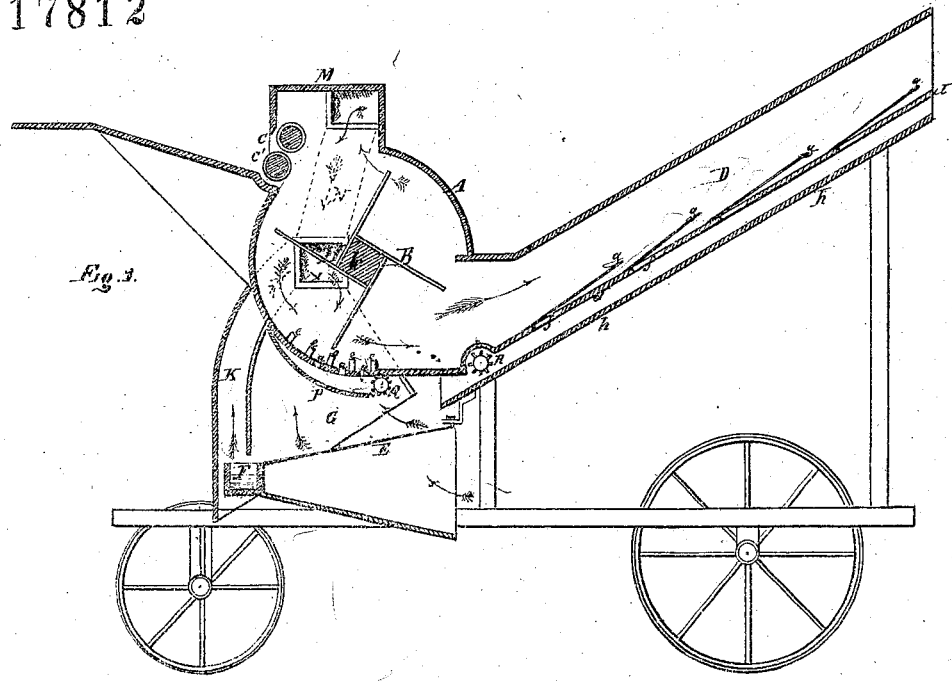
Figure 2:
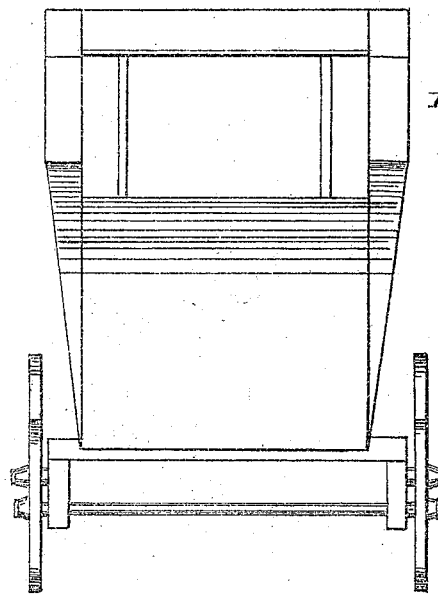
Figure 3:
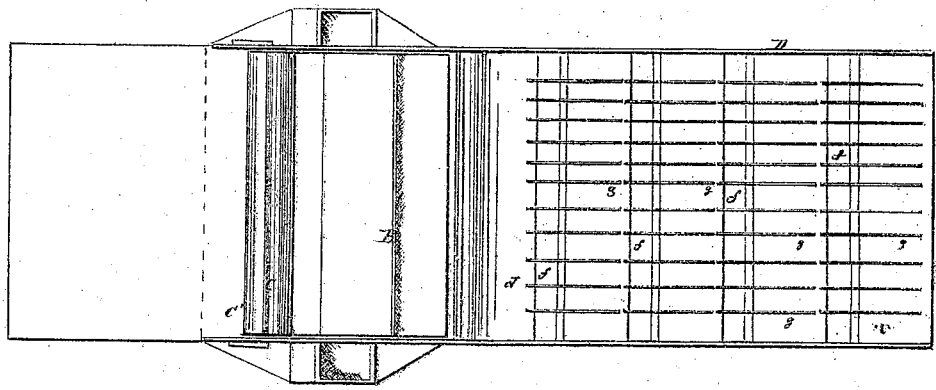
Figure 4:
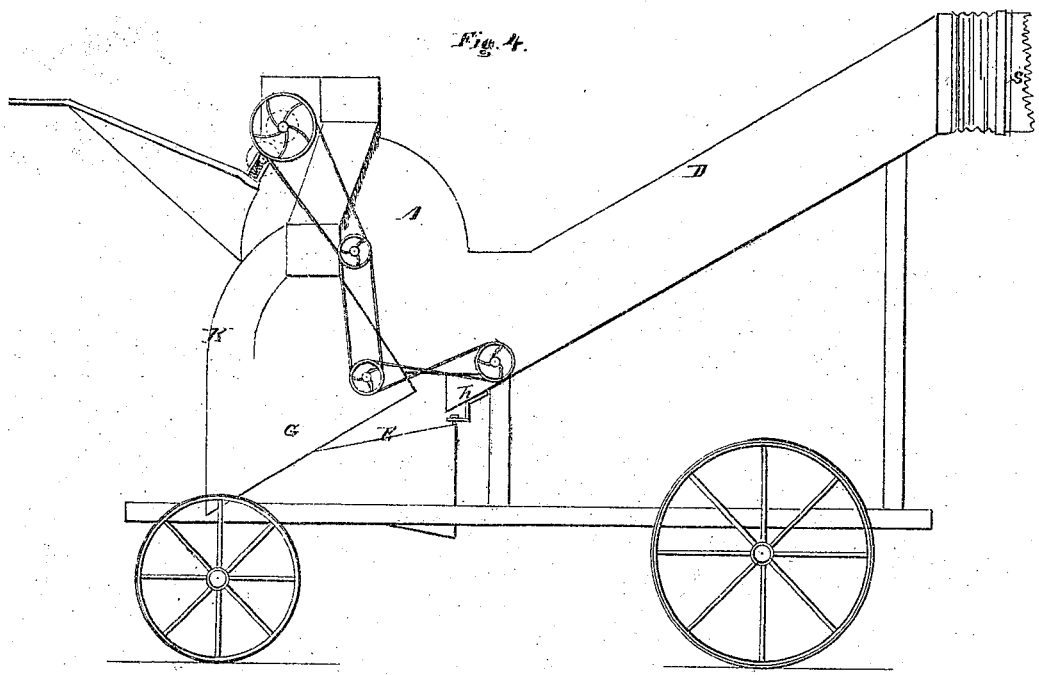

Figure 1 is a longitudinal sectional elevation of my invention. Fig. 2 is a view of the same looking toward the front end. Fig. 3 is a top or plan view of the same with covering removed, and Fig. 4 is a side elevation of the same.

Like letters of reference made use of in the several figures indicate like parts.

This invention has for its object to simplify and cheapen the construction of thrashing-machines by dispensing with a number of cumbersome and complicated mechanisms usually hitherto employed; and it consists of a thrashing or beating-cylinder for separating the grain, which cylinder is at the same time so constructed that it acts as a blast-fan. The blast and suction of this fan serve to blow out the straw and chaff, and force it through a tube to the straw-stack, and to suck or draw back into the thrashing-cylinder such heads of grain as are not fully or completely thrashed out; all of which will hereinafter at length and particularly be described and explained.

To enable those skilled in the art to make and use my invention, I will proceed to describe the same with particularity, making reference in so doing to the accompanying drawing.

A is the cylinder or casing, inclosing the fan B, which is carried by the central shaft $b$. The lower portion of the casing is furnished with a series of openings, $a\ a\ a$, and a series of teeth, $e\ e\ e$, forming what is usually termed a "concave." The outer edge of the vanes of the fan, also provided with teeth, play near these teeth, and by beating the grain against and between said teeth serve to thrash it out, while the thrashed grain falls through the openings $a$. C C' are two rollers placed at the opening, by which the un-thrashed grain is introduced. These rollers are covered with rubber, $c$, and are caused to revolve in opposite directions, so as to seize the straw as it is presented and drag it into the thrasher. The principal object of these rollers is, however, to prevent the escape of air from the fan at this point, for it will be readily perceived that if the ordinary unguarded aperture were employed the blast outward from the fan would be so great as to prevent the insertion of the grain at all, besides exhausting the fan. D is an upwardly-inclined tube, communicating for its full width with the fan-casing A. Through this tube the blast of the fan forces the straw from which the grain has been disengaged by the above-described thrashing process. This tube is made with a double or false bottom, $d$, which is perforated at intervals by transverse slots $f$, and a number of fingers or rods, $g$, is arranged within said tube, being attached to said false bottom, and said fingers serve to catch the straw in its passage, and lift it so that any grain which may have passed out along with it is shaken out and falls through the slots $f$ upon the second bottom $h$, from whence it flows down the incline, and is discharged upon a vibrating sieve, E, which allows the thrashed grain to pass through it, while such portion of the chaff as may have accompanied the grain so far in its descent is retained upon the sieve, as also such heads of wheat as may not have been completely thrashed—in short, what is usually termed the "tailings." A hood, G, communicating at the top with the supply-openings H of the fan, descends over the sieve E. All the air to supply the fan is drawn through this hood, and consequently quite a strong upward current is caused through the sieve, which lifts the chaff and conveys it back into the fan to be blown out through the tube D. At the back end of this hood is partitioned off a lesser passage, K, for the purpose of causing a stronger draught at this point to convey the tailings from the box F, into which they are shaken by the vibration of the sieve, back into the thrasher through the supply-openings H, where they are again subjected to the beating process. M is a chamber, constructed at the top of the casing A, to receive the air of the fan which is not forced out of the tube D, and which if carried further around might escape between the rollers C C' and cause a serious difficulty in feeding the thrasher. Outside tubes N conduct the air from this chamber back to the supply-openings H, a brisk current being thus kept up which completely or as near as possible prevents a blast at the part of the casing near the feeding-rollers C C'. The grain discharged at the first by way of the apertures $a$ in the bottom of the casing A falls upon a false bottom, P, beneath the said casing, which conducts it to the sieve E. To preserve the integrity of the air-currents as much as possible, I provide a fluted roller, Q, which guards the outlet of the false bottom P, and is revolved so as to allow the grain to escape, but prevents the ingress or egress of any very considerable current of air. A similar fluted roller, R, is arranged at the outlet of the false bottom of the tube D for a like purpose. To convey the straw to a desirable distance from the machine, I attach a jointed tube, S, to the upper extremity of the tube D, and extend it to the straw-stack, so that it acts as a stacker.

Having thus fully described the construction and operation of my invention, what I claim as new in thrashing-machines, and desire to secure by Letters Patent, is—

1. The combination of the fan-beater B and tight casing A, constructed with teeth $e$, as and for the purpose described.

2. The combination of the fan-beater B, tight casing A, air-chamber M, tube or tubes N, and supply-openings H, as and for the purpose described.

3. In combination with the fan-beater B and tight casing A, the valve and feed-rollers C C', constructed as and for the purpose described.

4. In combination with the fan-beater B and tight casing A, the straw-discharge tube D, provided with perforated false bottom, as and for the purpose described.

5. In combination with the fan-beater B, tight casing A, and sieve E, the hood G, as and for the purpose described.

6. In combination with the straw-discharge tube D, the stacker-tube, as and for the purpose described.

7. The fluted roller R, when employed in the connection and for the purpose specified and set forth.

WILLIAM M. PRATT.

Witnesses:
   J. W. MUNDAY,
   H. F. BRUNS.